(12) United States Patent
Nappier

(10) Patent No.: US 7,363,721 B2
(45) Date of Patent: Apr. 29, 2008

(54) COUNTERSINK GAUGE HAVING SELF-CENTERING PROBE

(75) Inventor: David N. Nappier, Caseyville, IL (US)

(73) Assignee: The Boeing Company, Chicago, IL (US)

( * ) Notice: Subject to any disclaimer, the term of this patent is extended or adjusted under 35 U.S.C. 154(b) by 116 days.

(21) Appl. No.: 11/268,860

(22) Filed: Nov. 7, 2005

(65) Prior Publication Data

US 2007/0101597 A1 May 10, 2007

(51) Int. Cl.
*G01B 3/00* (2006.01)
*G01B 5/00* (2006.01)

(52) U.S. Cl. .............................. 33/542; 33/836; 33/559

(58) Field of Classification Search .................. 33/542, 33/531, 832–833, 836, 572, 559–560, 556
See application file for complete search history.

(56) References Cited

U.S. PATENT DOCUMENTS

| | | | | |
|---|---|---|---|---|
| 1,966,618 A | * | 7/1934 | Egorenkov | 33/836 |
| 2,212,306 A | * | 8/1940 | Schwartz | 33/542 |
| 2,758,382 A | * | 8/1956 | Hurd | 33/836 |
| 3,116,560 A | * | 1/1964 | Matthews | 33/534 |
| 4,219,936 A | * | 9/1980 | Bridges | 33/534 |
| 4,905,378 A | * | 3/1990 | Culver et al. | 33/836 |
| 5,758,433 A | * | 6/1998 | Alberts | 33/836 |
| 6,088,923 A | * | 7/2000 | Guerin | 33/542 |

* cited by examiner

*Primary Examiner*—Yaritza Guadalupe-McCall
(74) *Attorney, Agent, or Firm*—Tung & Associates

(57) ABSTRACT

A feature of a countersink in a hole, such as the diameter, is measured by a gauge having a self centering, spherically shaped probe which shifts laterally upon engagement with the countersink side walls to as to align itself with the central axis of the hole. The gauge includes an outer tube gripped by a user during the measurement, and an axially displaceable shaft within the tube that drives an indicator dial. The shaft is coupled with the probe by a flexible connector which transmits axial displacement of the probe to the shaft but allows slight lateral movement of the probe relative to the shaft, permitting the probe to become centered within the countersink.

20 Claims, 2 Drawing Sheets

COUNTERSINK GAUGE HAVING SELF-CENTERING PROBE

FIELD OF THE INVENTION

This invention generally relates to measurement of workpiece features, and deals more particularly with a gauge having a self-centering probe for measuring a feature of a hole countersink.

BACKGROUND OF THE INVENTION

Countersink holes are commonly used throughout industry where it is necessary or desirable to recess the head of a fastener, such as a screw or rivet. For example, countersink holes are extensively employed in the aircraft industry, where rivets are used to attach an outer skin to frame members. In this application, it is particularly important that the top of the rivet be flush with the outer surface of the skin, otherwise non-flush rivets disturb the air flow over the skin, creating turbulence which adds drag to the aircraft. Consequently, it is important that the tapered side walls of the hole countersink have a precise depth calculated so that the top of the rivet is precisely flush with the skin surface.

A number of gauge devices exist for measuring features of countersinks, such as depth and diameter, however these prior devices sometimes yield erroneous measurements due to the fact that a probe forming part of the gauge is not precisely centered within the countersink hole opening. This misalignment problem stems from the fact that gauges are normally used in combination with fixtures that are used to drill the countersink hole. Such fixtures typically an opening provided with a bushing for supporting and guiding a drill motor and countersink bit. After the countersink hole is formed, the gauge is inserted through the guide bushing which theoretically is precisely aligned with the central axis of the countersink hole. However, due to bushing wear, tolerance stack-up of tool features and other factors, the central axis of the gauge is not, in fact, always precisely aligned with the central axis of the countersink hole. This axial offset causes the probe to contact only a portion of the tapered side wall in the countersink, thereby preventing it from being fully seated around the entire circumference of the tapered side wall, in turn generating error in the measurement.

Accordingly, there is a need in the art for a countersink gauge having a self-centering probe which overcomes the deficiencies of the prior art discussed above. The present invention is directed towards satisfying this need.

SUMMARY OF THE INVENTION

In accordance with one aspect of the invention, a gauge is provided for measuring a feature of a countersink hole in a workpiece. The gauge includes a tube, a displaceable shaft within the tube, an indicator coupled with one end of the shaft, a probe for engaging walls of the countersink, and a flexible coupling between the shaft and the probe which allows the probe to move laterally relative to the shaft upon engagement with the countersink walls. The flexible coupling is preferably an extension spring having one end coupled to the shaft and the other end coupled to the probe. The probe is spherical in shape and includes a shank secured by friction fit within the spring.

According to another aspect of the invention, a self-centering countersink measurement gauge is provided, comprising a displaceable probe for contacting walls of a countersink, an indicator assembly for measuring displacement of the probe, and a laterally flexible connector between the probe and the indicator assembly for centering the probe within the countersink. The flexible connector is preferably a coil spring which transmits axial force during displacement from the probe to the indicator assembly, while allowing the probe to move laterally so as to become centered within the countersink opening.

According to still another aspect of the invention, a device is provided for measuring a feature of a countersink formed in a workpiece hole using a countersink tool and a guide fixture for aligning the tool. The device comprises an indicator assembly positioned on the guide fixture, a displaceable probe for contacting walls of the countersink, and a centering connector connecting the indicator assembly with the probe. The connector transmits displacement of the probe to the indicator assembly but permits the probe to shift laterally so as to become centered on the central axis of the countersink. The device may be positioned above the countersink using a guide fixture that is normally used to align the countersink tool during drilling. Even though the device may be out of alignment with the countersink during the measurement, the self-centering probe shifts into axial alignment with the center of the countersink to provide a reliable, accurate feature measurement.

Various additional objects, features and advantages of the present invention can be more fully appreciated with reference to the detailed description and accompanying drawings that follow.

DETAILED DESCRIPTION OF THE PREFERRED EMBODIMENTS

Figure 1:
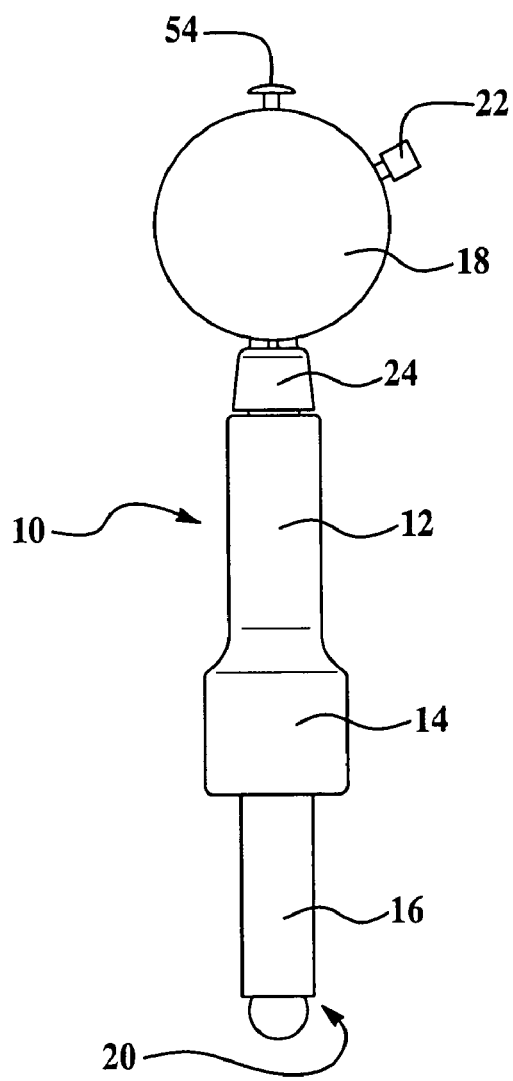
FIG. 1 is a front elevation view of a countersink gauge having a self-centering probe which forms the preferred embodiment of the invention.
Figure 2:
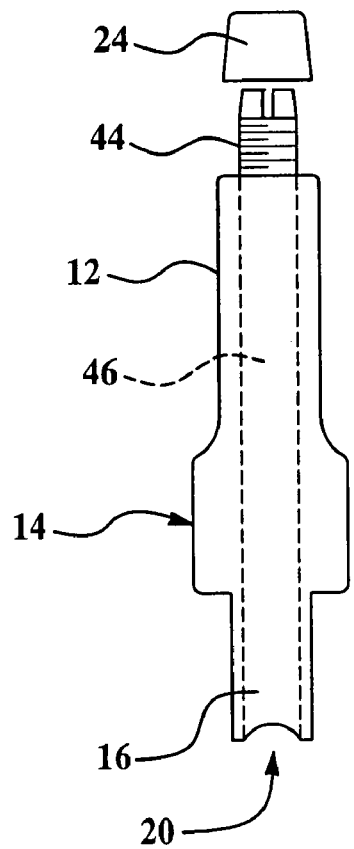
FIG. 2 is an exploded view of the outer tube assembly of the gauge shown in FIG. 1.
Figure 3:
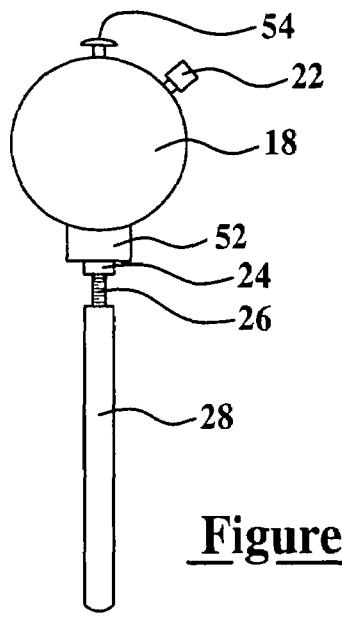
FIG. 3 is an exploded view, showing details of the self-centering probe.
Figure 3:
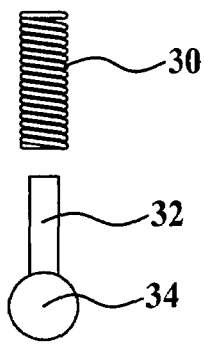
Figure 4:
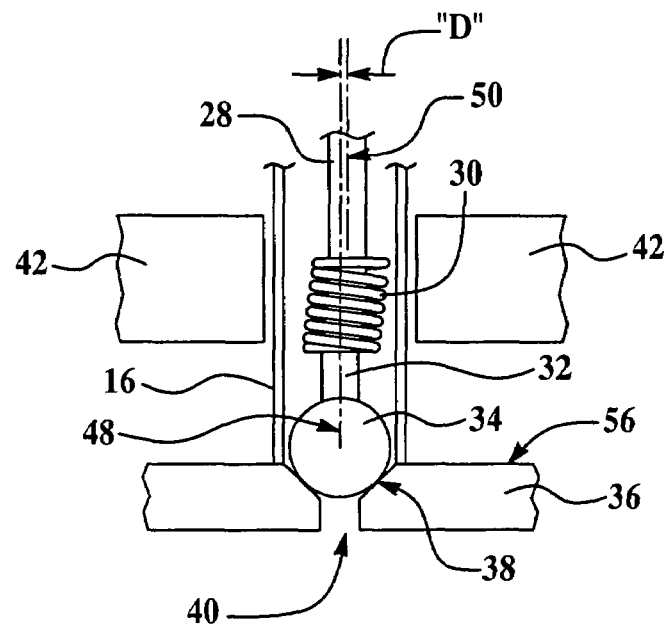
FIG. 4 is an enlarged, sectional view showing the probe measuring the diameter of a hole countersink formed in a workpiece.

Referring to the drawings, a countersink gauge generally indicated by the numeral 10 in FIG. 1 includes an analog indicator 18 for indicating the measurement of a feature such as the countersink diameter, and an elongate body in the form of a tube 12. The tube 12 includes an intermediate knurled section 14 intended to be gripped by a operator, and a lower end 16 in which a later discussed probe 34 is contained. The tube 12 is secured to the indicator 18 by means of a split collet 44 and nut 24 which is sleeved over a short cylindrical extension 52 at the bottom of the indicator 18. Tightening of the nut 24 squeezes the collet 44 onto the extension 52, thus securing the tube 12 on the indicator 18. The tube 12 includes a central, cylindrical bore 46 throughout its entire length. The lower end 16 of tube 12 is provided with a series of actuate cutouts or scallops 20. A screw 22 on the indicator 18 allows rotational adjustment of the face of the indicator 18, and is typically used to "zero-out" the gauge. The indicator 18 includes a plunger button 54, which when depressed by an operator, displaces the probe 34 down through the tube 12 into contact with the countersink walls, producing a reading on the indicator 18, which in the illustrated embodiment, comprises the diameter of the countersink. A connecting shaft 28 has its upper end provided with threads 26 which are received within and secure the shaft 28 to the plunger 24.

The probe 34, which is spherical in shape, includes an elongate, cylindrically shaped shank 32 which is received in tight, frictional fit engagement within the lower end of a flexible connection in the form of a coiled, extension spring 30. Similarly, the lower end of shaft 28 is received in tight, frictional fit engagement within the upper end of spring 30. Preferably, the diameters of the shaft 28 of shank 32 are approximately the same as the inside diameter of the spring 30 in order to assure that the spring 30 provides a tight connection between the shaft 28 and the shank 32. The diameter of the probe 34 is slightly less than the inside diameter of the bore 46 in tube 12. The shaft 28, threads 26, extension 52 and indicator 18 form an indicator assembly which is connected to the probe 34 by spring 30 and functions to convert axial displacement of the probe 34 into a measurement reading displayed on the indicator 18 corresponding to the diameter of the countersink. The indicator includes internal mechanisms (not shown) well known in the art, which convert the axial displacement of the probe 34 into a countersink diameter reading based on the known relationship between the angle of the taper of the sidewalls 38, and the distance between the upper surface 56 and the side walls 38.

In use, the lower end 16 of the tube 12 is passed through an opening in a fixture that is normally used to guide a countersink drill bit which has been used to form a countersink hole 40 in a workpiece 36. More particularly, the lower end 16 passes through a central opening in a bushing 42 carried on the fixture, wherein the central axis of the bushing 42 is indicated by the numeral 50. The central axis 48 of the countersink hole 40, however, is slightly offset from axis 50 by an amount indicated by the letter "D".

The operator depresses button 54, causing shaft 28 to downwardly. This downward displacement of shaft 28 is transmitted directly through spring 30 and shank 32 to the spherical probe 34. As the probe 34 moves downwardly, it contacts the tapered side walls 38 of the countersink hole 40, uniformly seating around the entire periphery of the tapered side wall 38. As the probe 34 moves downwardly into contact with the side wall 38, the probe 34 is displaced laterally a slight amount to compensate for the offset or misalignment D. This lateral displacement of the probe 34 is made possible by the flexible nature of spring 30 which exhibits no flexing or compression in its axial direction but flexes laterally a small amount, permitting the probe 34 to center itself in the countersink opening 40.

Typically, the indicator 18 includes an internal spring (not shown) that normally biases the shaft 28 upwardly. Thus, when the user removes his finger from button 54 after having displaced the shaft 28 during a measurement reading, the internal spring biases the shaft 28 upwardly, moving the probe 34 inside the bottom end 6 of the tube 12.

Although this invention has been described with respect to certain exemplary embodiments, it is to be understood that the specific embodiments are for purposes of illustration and not limitation, as other variations will occur to those of skill in the art.

What is claimed is:

1. A gauge for measuring a feature of a hole countersink formed in a workpiece, comprising:
   a tube;
   a displaceable shaft disposed within the tube;
   a feature measurement indicator coupled with one end of the shaft for indicating a feature measurement reading based on the displacement of the shaft;
   a probe for engaging walls of the countersink, wherein the probe includes a spherical member having a diameter less than the diameter of the tube, and a shank fixed to the spherical member and axially aliqned with the shaft; and,
   a flexible coupling between the other end of the shaft and the probe, the flexible coupling allowing the probe to move laterally in a radial direction relative to the shaft upon engagement with the countersink walls, wherein the flexible coupling includes a coil spring having first and second open ends, the shaft and the shank being respectively received in tight frictional engagement within the open ends of the spring.

2. The gauge of claim 1, wherein the tube forms an outer body of the gauge and is secured to the indicator.

3. The gauge of claim 1, wherein the probe includes a spherical member having an outside diameter less than the diameter of the inside diameter of the tube.

4. The gauge of claim 1, wherein the flexible coupling is a coil spring.

5. The gauge of claim 4, wherein the coil spring is an extension spring.

6. The gauge of claim 5, wherein the spring is sleeved over the other end of the shaft and held on the shaft by the force of friction.

7. A self-centering countersink gauge, comprising:
   a displaceable probe for contacting the walls of a countersink;
   an indicator assembly for indicating the measurement of a feature of the countersink based on displacement of the probe; and,
   a laterally flexible connector between the probe and the indicator assembly for centering the probe within the countersink, wherein the flexible connector is a coil spring having opposite open ends and wherein the probe and the indicator assembly are respectively received in tight frictional engagement within the open ends of the spring.

8. The gauge of claim 7, wherein the indicator assembly includes a tube, and the probe is disposed within the tube and laterally displaceable relative to the central axis of the tube.

9. The gauge of claim 7, wherein the flexible connector is a coil spring.

10. The gauge of claim 9, wherein the indicator assembly includes an axially displaceable shaft and the spring is secured to one end of the shaft.

11. The gauge of claim 9, wherein the indicator assembly and the probe are respectively secured to opposite ends of the spring.

12. The gauge of claim 7, wherein:
   the flexible connector is a coil spring,
   the probe includes a spherical member for engaging walls of the countersink, and a shank extending outwardly from the spherical member,
   the indicator assembly includes an axially displaceable shaft, and,
   the shaft and the shank are connected by the spring.

13. A device for measuring a feature of a countersink formed in a workpiece hole using a countersink tool and a guide fixture to align the tool, comprising:
   a measurement indicator assembly positioned on the guide fixture;
   a displaceable probe for contacting walls of the countersink; and, a centering connector connecting the indicator assembly with the probe, the connector transmitting displacement of the probe to the indicator assembly but permitting the probe to shift laterally so as to be centered on the central axis of the countersink, wherein the connector is a coil spring having opposite open ends, and wherein the probe and the indicator assembly are respectively received in tight frictional engagement within the open ends of the spring.

14. The device of claim 13, wherein:

the indicator assembly includes a tube having a central axis not of alignment with the central axis of the countersink, and, the probe is disposed within the tube and is laterally displaceable relative to the central axis of the tube.

15. The device of claim 13, wherein the connector is a coil spring.

16. The device of claim 15, wherein the indicator assembly includes an axially displaceable shaft and the spring is secured to one end of the shaft.

17. The device of claim 13, wherein the indicator assembly and the probe are respectively secured to opposite ends of the spring.

18. A gauge for measuring a feature of a hole countersink formed in a workpiece, comprising:

a tube;

a displaceable shaft disposed within the tube;

a feature measurement indicator coupled with one end of the shaft for indicating a feature measurement reading based on the displacement of the shaft;

a probe for engaging walls of the countersink; and, a flexible coupling between the other end of the shaft and the probe, the, flexible coupling allowing the probe to move laterally in a radial direction relative to the shaft upon engagement with the countersink walls.

19. A self-centering countersink gauge, comprising:

a displaceable probe for contacting the walls of a countersink;

a indicator assembly for indicating the measurement of a feature of the countersink based on displacement of the probe; and, a laterally flexible connector between the probe and the indicator assembly for centering the probe within the countersink.

20. A device for measuring a feature of a countersink formed in a workpiece hole using a countersink tool and a guide fixture to align the tool, comprising:

a measurement indicator assembly positioned on the guide fixture;

a displaceable probe for contacting walls of the countersink; and, a centering connector connecting the indicator assembly with the probe, the connector transmitting displacement of the probe to the indicator assembly but permitting the probe to shift laterally so as to be centered on the central axis of the countersink.

* * * * *